Oct. 13, 1925.
S. HAMMER
BOX HINGE
Filed Feb. 27, 1924
1,557,454
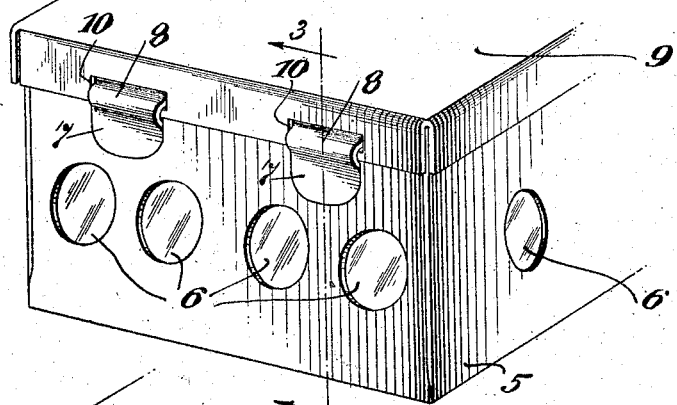
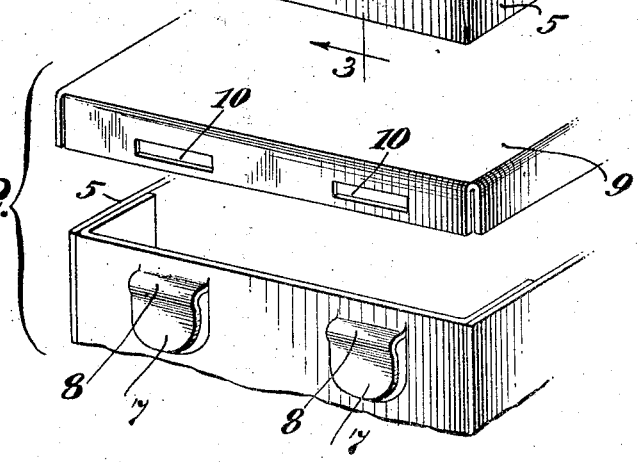
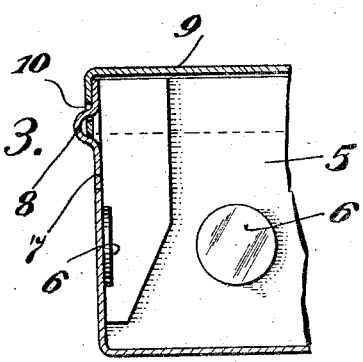
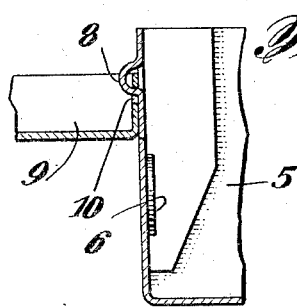
INVENTOR,
Samuel Hammer
BY C. P. Goepel
his ATTORNEY Patented Oct. 13, 1925.

1,557,454

UNITED STATES PATENT OFFICE.

SAMUEL HAMMER, OF BROOKLYN, NEW YORK, ASSIGNOR TO UNITED METAL BOX COMPANY, INC., OF LONG ISLAND CITY, NEW YORK, A CORPORATION OF NEW YORK.

BOX HINGE.

Application filed February 27, 1924. Serial No. 695,455.

*To all whom it may concern:*

Be it known that I, SAMUEL HAMMER, a citizen of the Republic of Russia, and resident of Brooklyn, county of Kings, and State of New York, have invented certain new and useful Improvements in Box Hinges, of which the following is a specification.

This invention relates to an improved box hinge and is more particularly designed for use as a cover hinge for metal boxes for electrical apparatus, such as junction, cutout and switch boxes, the primary object and purpose of my present improvements being to provide a hinge formed from parts of the box which may be produced in a minimum number of mechanical operations and in which the hinge structure itself is exceedingly simple, and at the same time strong and durable, so that it will withstand rough handling or abuse.

More particularly, in one embodiment of my invention I propose to provide one of the body walls of the box with outwardly punched hinge tongues adjacent the open side of the box body and having their free ends directed downwardly toward the base of the box and provided with bends therein adjacent their juncture with the box wall to form hinge sleeves or knuckles. These tongues are cut from the box wall by means of suitable cutting and shaping dies and are projected from the plane of said wall. When in this position, the hinge tongues are engaged through slots cut in one of the end flanges of the box cover, the portions of said flanges at the outer sides of the slots being positioned in the sleeves or knuckles of said tongues. The end portions of the hinge tongues are then forced inwardly into the openings from which they were projected so that said ends of the tongues substantially close said openings and are disposed in the same plane as the box wall. By means of such a construction of the hinge connection between the box wall and cover, it will be appreciated that when the box cover is open, the end flange thereof will bear against the ends of said tongues, the weight of the cover tending to force the said tongues in an inward direction, and relieve said tongues of all strain which would tend to displace the same from the plane of the box wall.

A further advantage of the new hinge construction is due to the fact that the projection of parts of the hinge from the face of the box wall is reduced to a minimum, so that the boxes may be very closely nested in shipment.

With the above and other objects in view, the invention consists in the improved box hinge and in the form, construction and relative arrangement of the several parts, as will be hereinafter more fully described, illustrated in the accompanying drawings and subsequently incorporated in the subjoined claims.

In the drawings wherein I have illustrated one simple and practical embodiment of the invention and in which similar reference characters designate corresponding parts throughout the several views, Figure 1 is a perspective view of one end of an electrical junction or cutout box showing my improved cover hinge therefor; Figure 2 is a similar view illustrating the position of the hinge parts on the box wall before the connection of the cover or lid therewith; Figure 3 is a vertical sectional view taken on line of 3—3 of Figure 1, the cover being closed and Figure 4 is a similar view, showing the cover in open position.

Referring in detail to the drawing, Figure 5 designates the body of the box, which is constructed in any ordinary or approved manner from sheet metal, and the side and end walls of which are provided with the usual knockouts 6.

In carrying out my present invention, the portion of the metal sheet from which one end wall of the box body is formed, is provided adjacent to the end edge thereof at the open side of the box with spaced hinge parts. As shown, each of these hinge parts consists of a tongue 7 of requisite width and length, and these tongues are formed by means of suitable cutting and bending dies which stamp out or cut the tongue from the metal sheet and simultaneously project said tongue from the plane of the sheet and form in the tongue, at the end thereof which is integrally connected with the metal sheet, a semi-circular bend 8 which forms a hinge sleeve or knuckle open on the inner side thereof. Thus, as shown in Figure 2 of the drawings, it will be seen that the free end portions of the hinge tongues 7 extend downwardly in outwardly spaced parallel relation from the body wall of the box towards the base thereof.

The box cover 9 is also formed from a metal sheet having angular marginal flanges, one of which is provided with spaced rectangular openings 10 for the purpose of receiving the tongues 7 on the body wall of the box.

In assembling the box parts, the cover 9 is positioned with the flange having the openings 10 thereof disposed at right angles to the tongues 7 and below the same the cover is then moved upwardly so that said tongues are engaged through the respective openings 10 until the portions of the cover flange at the outer sides of these openings are engaged in the respective hinge sleeves or knuckles 8. The box cover 9 is then moved to its closed position over the open side of the box and finally pressure is applied to the free ends of the tongues 7 and said tongues are forced inwardly into the openings in the box wall until they are disposed in the plane of said wall, as seen in Figure 3 of the drawings. It will be seen that the openings 10 in the cover flange are of ample width so that said flange may swing freely with respect to the sleeves or knuckles 8 when the cover is in open position, as shown in Figure 4 of the drawing. It will be noted that the flange thereof overlies and bears against the tongues 7 and against the box wall 8. The weight of this cover naturally tends to cause the same to swing inwardly by gravity against said tongues, thus applying a constant pressure thereon so that the same will not be disposed from the plane of the box wall. It will be apparent that this feature would not be present, if the tongues 7 extended in an upward direction with respect to the ends thereof which are integrally connected with the box wall and in the latter instance the weight of the cover would exert an outward strain upon the tongues, tending to displace the same from the plane of said wall. Thus, it will be appreciated that the durability and serviceability of the hinge connection is greatly increased over such hinge structures as have heretofore been employed on boxes of this character.

Further, it will be noted that the end flange of the box cover lies very closely to the body wall of the box, both in the open and closed positions of said cover, so that the entrance of dirt or other foreign matter to the interior of the box through the hinge connections is practically precluded. Another advantageous feature of the present construction is that in view of the fact that the only projecting parts are the semi-circular hinge sleeves or knuckles 8, the boxes can be very closely packed so that a maximum number of the boxes can be arranged in a minimum space for shipment.

From the foregoing description in connection with the accompanying drawing, the construction and several advantages of my improved box hinge will be clearly understood. I have referred to the device as being particularly designed for use in connection with metal boxes for electrical apparatus but it will be understood that such a hinge connection may also be advantageously employed in various other instances where a simple connection of great strength and stability is desired. It will further be understood that the particular shape or dimensions of the tongues 7 is not essential, and these tongues may be of various other forms and the connection between the two parts may be made by means of any desired number of such hinge tongues. The essential and distinguishing feature, regardless of matters of form, resides in the fact that said tongues having the hinge sleeves extend in a downward direction from the open side of the box in the plane of the box wall, so that an inward pressure is exerted thereon when the cover is in its open position. Therefore, it will be understood that in so far as this essential characteristic of my present improvement is concerned, the structure might be exemplified in numerous other alternative forms, and accordingly I reserve the privilege of resorting to all such legitimate changes in the construction and relative arrangement of the several parts as herein described, as may be fairly embodied within the spirit and scope of the invention as claimed.

I claim:

1. A box having a tongue integral at one of its ends with a body wall of the box and provided at said end with a bend therein forming a hinge sleeve or knuckle, the cover of said box having a flange provided with an opening therein through which said tongue is engaged and the other free end portion of said tongue extending towards the base of the box and within the plane of the box wall, said cover flange having a part at the outer side of said opening engaged in said hinge knuckle and said cover flange exerting an inward pressure against said tongue when the cover is in open position.

2. A sheet metal box having a body wall and spaced tongues cut from said wall, each integrally connected with the wall adjacent to the open side of the box and having a hinge sleeve or knuckle formed therein, and a cover for said box having a marginal flange provided with spaced openings through which said tongues are engaged, and said tongues extending downwardly from said knuckles toward the base of the box and in the plane of said body wall, parts of said cover flange being engaged in said knuckles and said flange exerting an inward pressure against said tongues when the cover is in open position.

3. A box having a tongue struck from one wall thereof and provided at one end with a hinged knuckle integrally connected with said wall, the other end of said tongue being free and projecting in the plane of said wall towards the base of the box, and a cover for said box having a pintle engaged in said hinge knuckle whereby, when said cover is moved to its open position, a part of the cover is urged by the weight of the cover against the free end of said tongue to prevent displacement of the latter from the plane of the box wall.

In testimony that I claim the foregoing as my invention, I have signed my name hereto.

SAMUEL HAMMER.